May 20, 1969  J. W. BURNS  3,445,079
V/STOL AIRCRAFT
Filed July 27, 1966  Sheet 3 of 5

INVENTOR.
JOHN W. BURNS
BY Darby & Darby
ATTORNEYS

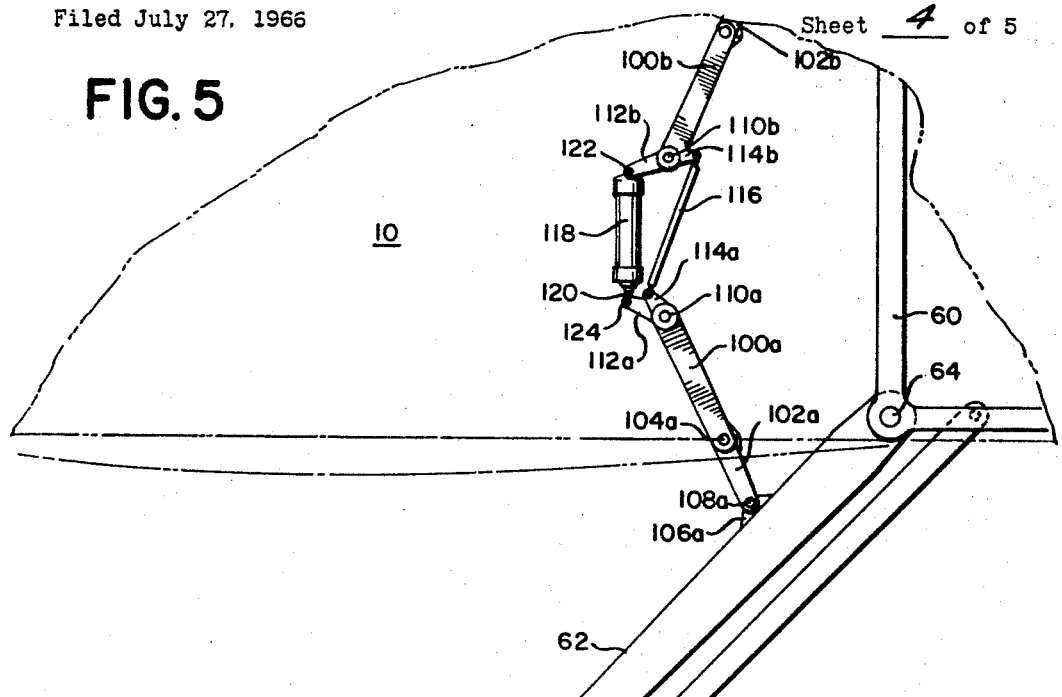
FIG. 5
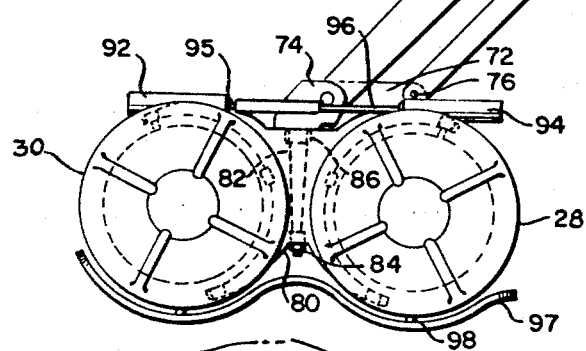
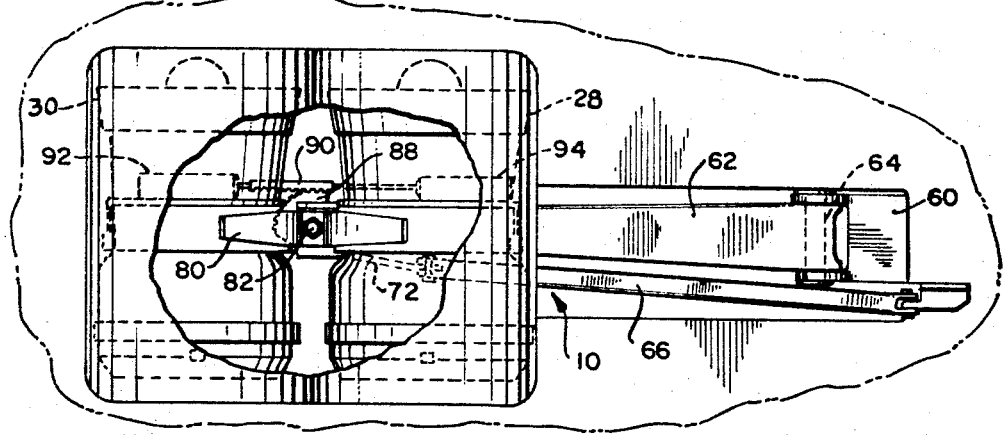
FIG. 6

INVENTOR
JOHN W. BURNS
BY Darley & Darley
ATTORNEYS

United States Patent Office 3,445,079
Patented May 20, 1969

3,445,079
V/STOL AIRCRAFT
John W. Burns, Northport, N.Y., assignor to Fairchild Hiller Corporation, Hagerstown, Md., a corporation of Maryland
Filed July 27, 1966, Ser. No. 568,317
Int. Cl. B64b *1/24;* B64d *27/00*
U.S. Cl. 244—54
5 Claims

ABSTRACT OF THE DISCLOSURE

A V/STOL aircraft comprises two pairs of lifting jets mounted on respective mounting arms on each side of the aircraft. The lifting jets are movable on the mounting arms from a position within the fuselage, where they are stored with their longitudinal axes parallel to the longitudinal axis of the aircraft, to a position exterior of the aircraft for vertical take-off and landing. The lifting jets are rotatable with respect to their associated mounting members so as to provide a substantial amount of vertical thrust. The fuel which is consumed by the engines during take-off may be stored in collapsible bladders disposed within the compartment in the fuselage occupied by the lifting jets during normal horizontal flight.

---

The present invention relates to aircraft which are capable of taking off and landing vertically or within extremely short distances. Such aircraft are commonly known as V/STOL aircraft which means Vertical or Short Take-Off and Landing aircraft.

Considerable effort has been exerted in recent years toward the design and development of V/STOL aircraft and the problem of providing substantial vertical thrust within the normally severe weight and space restrictions. Because the requirements for vertical or substantially vertical control of an aircraft differ substantially from those existing during normal flight, it has been proposed to use special propulsion units which function only during take-off and landing. Heretofore, such proposed constructions have proven unsatisfactory for various reasons including the introduction of drag due to the addition of separate propulsion units for vertical thrust.

Other proposed constructions have suggested the use of retractable propellers which can be stored within the fuselage and withdrawn to a position in which they can provide vertical thrust by driving them from the exhaust of standard propulsion units. However, for known reasons, dependence of the vertical thrust units upon the horizontal propulsion engines is undesirable from the viewpoints of reliability and safety.

Accordingly, the main object of the present invention is to provide a generally improved V/STOL aircraft avoiding or at least reducing many or all of the drawbacks inherent in prior art constructions.

A feature of the present invention is that the vertical propulsion units are totally independent of the horizontal propulsion units and yet, during normal flight, do not substantially increase the air resistance of the aircraft.

Another feature of the invention is that, after take-off, the vertical propulsion units may be withdrawn into the aircraft in such a manner as to occupy the space previously occupied by the fuel consumed by the vertical propulsion units during take-off. In this fashion, space requirements for the vertical propulsion units are substantially reduced.

Briefly, in accordance with the invention, a plurality of lifting jet engines are stored in the fuselage of the aircraft in such a fashion that they can be readily moved to a position exterior of the fuselage. Preferably, such engines may comprise commercially available turbo-jets having an extremely high thrust-to-weight ratio and means are further provided to vary the direction of thrust, for example, between horizontal and vertical positions so that the aircraft can be employed for short as well as vertical takeoffs and landings. Moreover, in emergency situations, the high thrust jets may be used to supplement the conventional power plants used to drive the aircraft in normal flight. It is further contemplated that the storage space within the fuselage used to contain the lifting jets be employed prior to take-off as a store for the fuel which is to be consumed by the jets during take-off. Thus, after take-off, the lifting jets are immediately returned to the compartment previously occupied by the consumed fuel thus realizing a substantial saving in space.

Other benefits and advantages of the invention will become apparent in the light of the following descriptions taken with the attached drawings, wherein:

FIGURE 5 is a top plan view of the mechanism of FIGURE 3 showing the lifting jets in extended position for vertical take-off or landing;

FIGURE 6 is a side view corresponding to FIGURE 5; and

Figure 1:
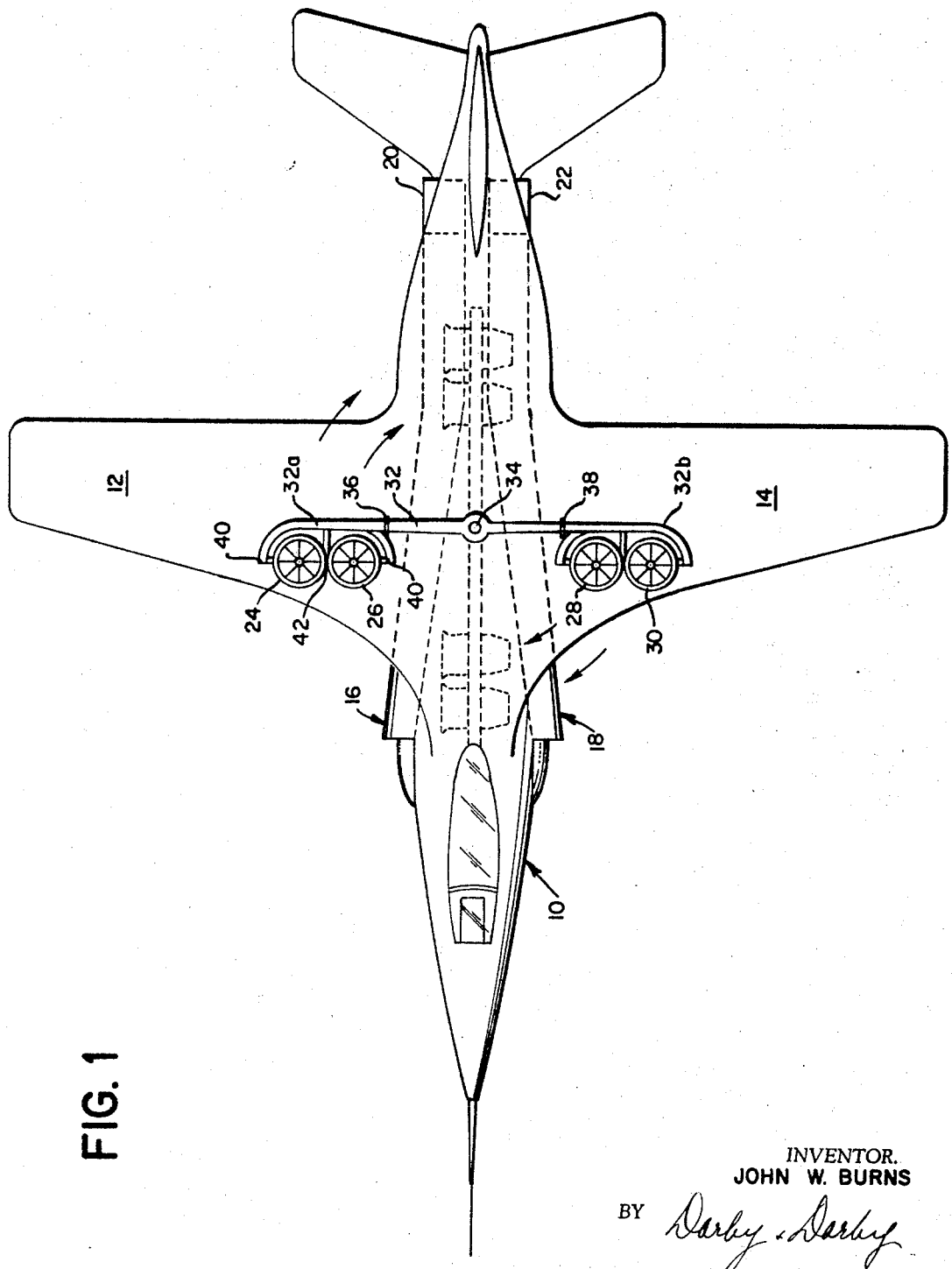
FIGURE 1 is a top plan view of an aircraft embodying the invention, shown in full line for clarity.
Figure 2:
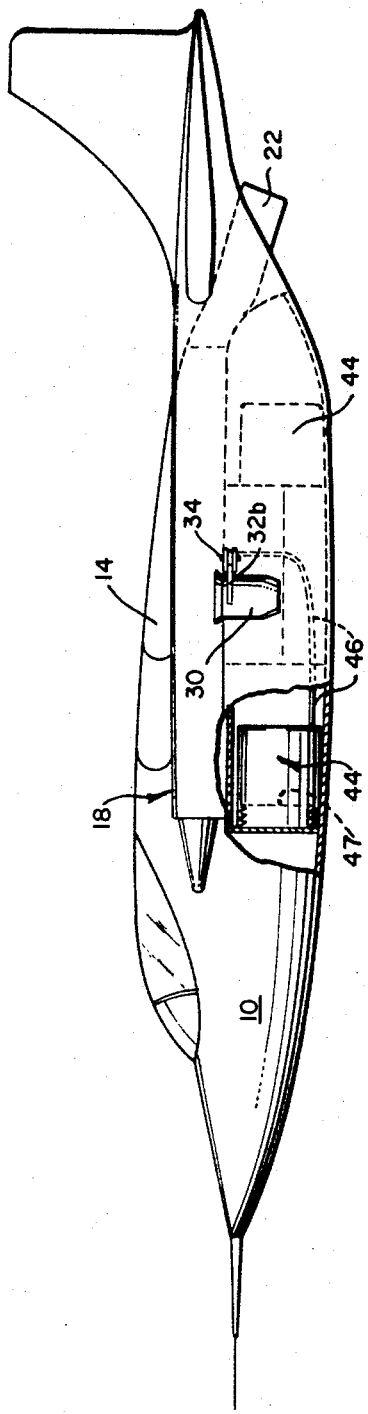
FIGURE 2 is a side view of the aircraft corresponding to FIGURE 1.

Referring to FIGURES 1 and 2, a jet aircraft is illustrated having a fuselage 10 and wings 12 and 14. Wings 12 and 14 may be of the variable sweep type but this forms no part of the present invention. Standard lift/cruise jet engines 16 and 18, similar to the Bristol Siddeley Pegasus engine with deflecting rear nozzles, are provided on each side of the fuselage 10 with the exhausts extending at 20 and 22, respectively. The engines 16 and 18 are capable of deflecting thrust to the vertical direction to aid in vertical take-off as well as providing horizontal thrust for propelling the aircraft in normal flight.

In accordance with the invention, four lifting turbo-jet engines 24, 26, 28 and 30 are mounted on an elongated axle 32 which is pivotally supported by a central hub 34 on the frame (not shown) of the aircraft. Axle 32 includes outer portions 32a and 32b which are mounted by roller bearings 36 and 38, respectively, to permit rotation of the turbo jet assemblies with respect to the central axle portion 32. Each of the axle portions 32a and 32b may include curved mounting portions 40 cooperating with a central bracket 42 to rigidly support the associated lifting jets with respect to the associated axle portion 32a or 32b.

During vertical movement, i.e., take-off and landing, the lifting jets 24, 26, 28 and 30 will be in the position illustrated in solid lines in FIGURES 1 and 2. Two expanded bladders 44 (FIG. 2) may occupy the volume within fuselage 10 to be occupied by the lifting jets during conventional flight as described below. The fuel from bladders 44 is fed to the engines by a fuel line 46 in a conventional manner, the fuel line 46 running along or through the axle portions 32 and 32a or 32b as the case may be, in an obvious manner.

After the aircraft has commenced its vertical take-off, and the fuel within bladders 44 has been consumed, the bladders will be collapsed as shown in dotted lines at 47 (FIG. 2) so that there is room within fuselage 18 for the lifting jets 24, 26, 28 and 30. Accordingly, axles 32a and 32b are caused to rotate ninety degrees so that the thrust axes of the four lifting jets are horizontal, and then the entire axle 32 is rotated ninety degrees so that the lifting jets are pivoted into the fuselage 18 in the compartments formerly occupied by the expanded bladders 44. It is desirable that bladders 44 be re-usable, and to this end the bladders may be provided with an accordion-like frame which will gradually collapse to the position indicated by the dotted line 47 in FIGURE 2 to form a neat package at one end of the fuselage compartment. To facilitate the gradual collapse of bladders 44 as fuel is consumed, the bladders may be subjected to pressure from any conventional means to cause the bladders to fold as they are emptied of fuel. Such pressure may also serve in an obvious fashion to pump or assist in pumping the fuel to the lifting jets.

FIGURES 1 and 2 do not illustrate the actual drive means for pivoting the axles 32a and 32b with respect to axle 32, or the means which pivots the entire axle assembly with respect to the transverse axis of the aircraft, and the invention is not limited to specific means for accomplishing these functions. By way of example only, it is contemplated that the power for this purpose be provided by a hydraulic system designed in accordance with conventional practices.

The lifting engines 24, 26, 28 and 30 can be rotated as desired between horizontal and vertical positions to provide for short take-off and landing depending upon the thrust direction. Also, the desired thrust direction may be achieved by rotating cascades or blades (not shown) at the back of the lifting jets to deflect the thrust vector in a desired direction. This latter feature may prove desirable in the event the lifting jets cannot be rotated to a full vertical position for take-off due to airflow interference from the wings.

FIGURES 3 through 7 illustrate another embodiment of the invention in which the lifting jets are supported on individual beams rather than a single main axle as in FIGURES 1 and 2. For the purpose of describing the actual mechanical detail of the invention, the main fuselage portion of the aircraft (which may be conventional) is not illustrated except in fragmentary form. Wherever possible, the identical reference numerals of FIGURES 1 and 2 are used to indicate a corresponding part in FIGURES 3 through 7. Also, in this embodiment, the bladders 44 containing the fuel for the lifting jets are not illustrated, although it is contemplated that such cells be used if so desired.

Figure 3:
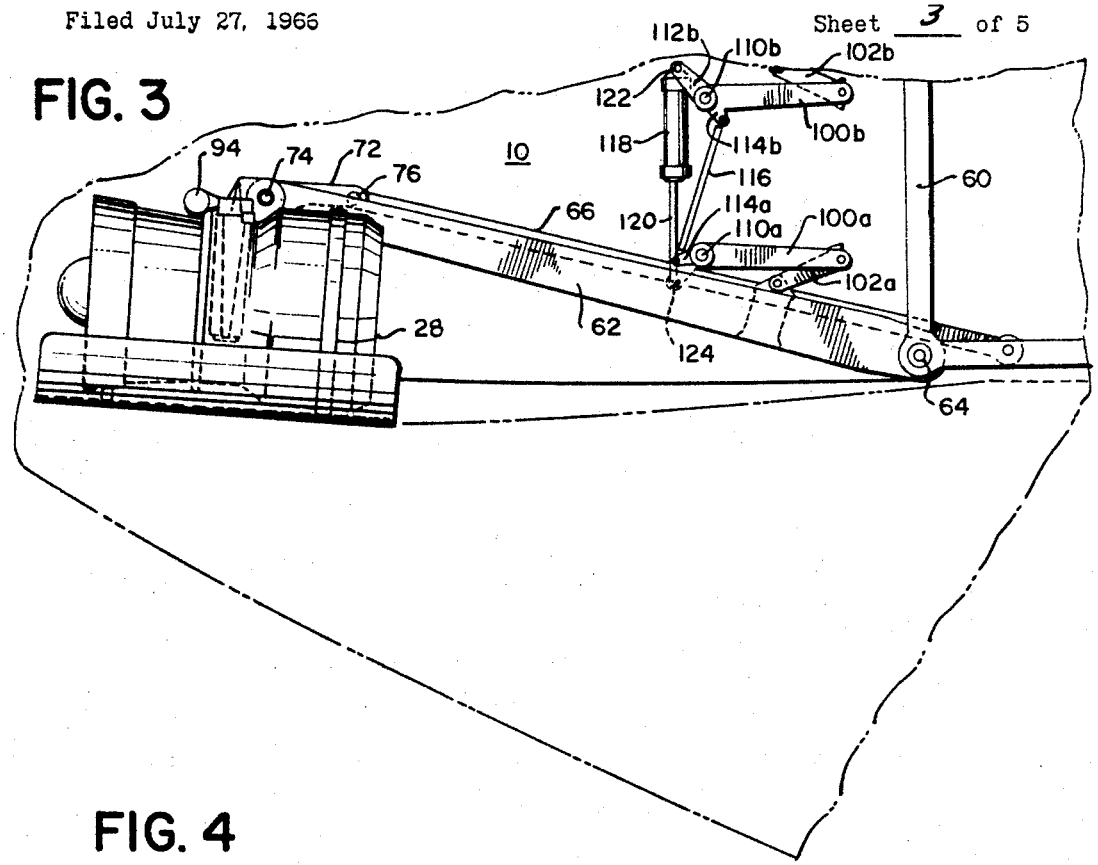
FIGURE 3 is a top plan view of the lifting jets and the mechanism for moving such jets according to another embodiment of the invention.
Figure 4:
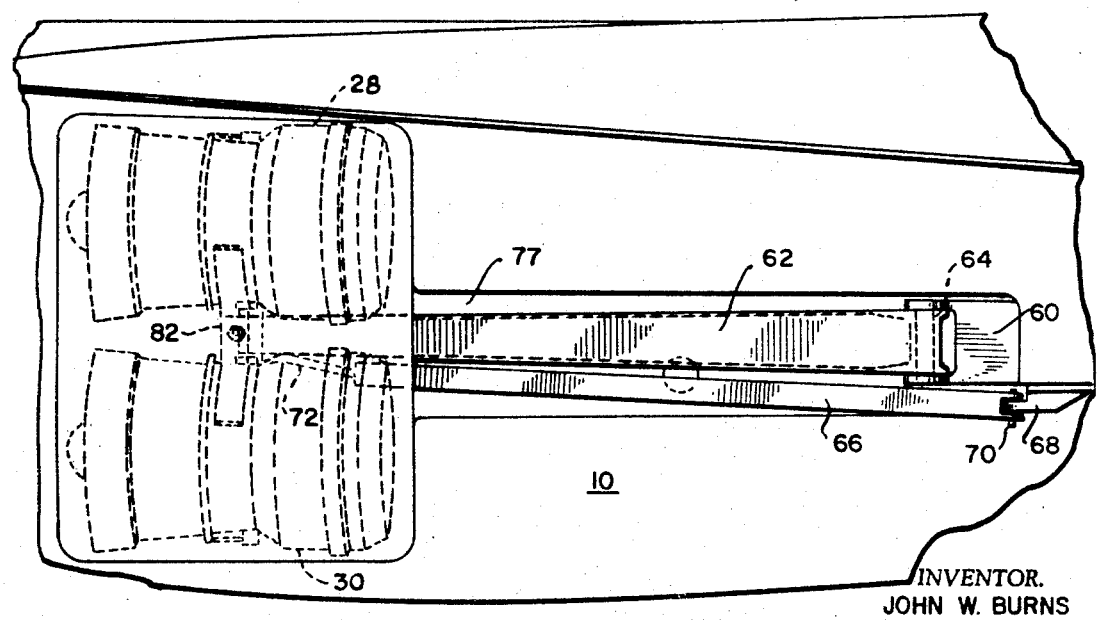
FIGURE 4 is a side view corresponding to FIGURE 3.

In the embodiment of FIGURES 3 through 7, the lifting jets 24, 26, 28 and 30 are stored with their axes arranged substantially parallel to the axis of the aircraft, and each pair of jets is stored with one immediately above the other (see FIG. 4). Since the construction associated with each pair of lifting jets is substantially identical, only the construction corresponding to the port side of the aircraft, i.e., lifting jets 28 and 30 is fully described and illustrated in FIGURES 3 to 7.

Figure 7:
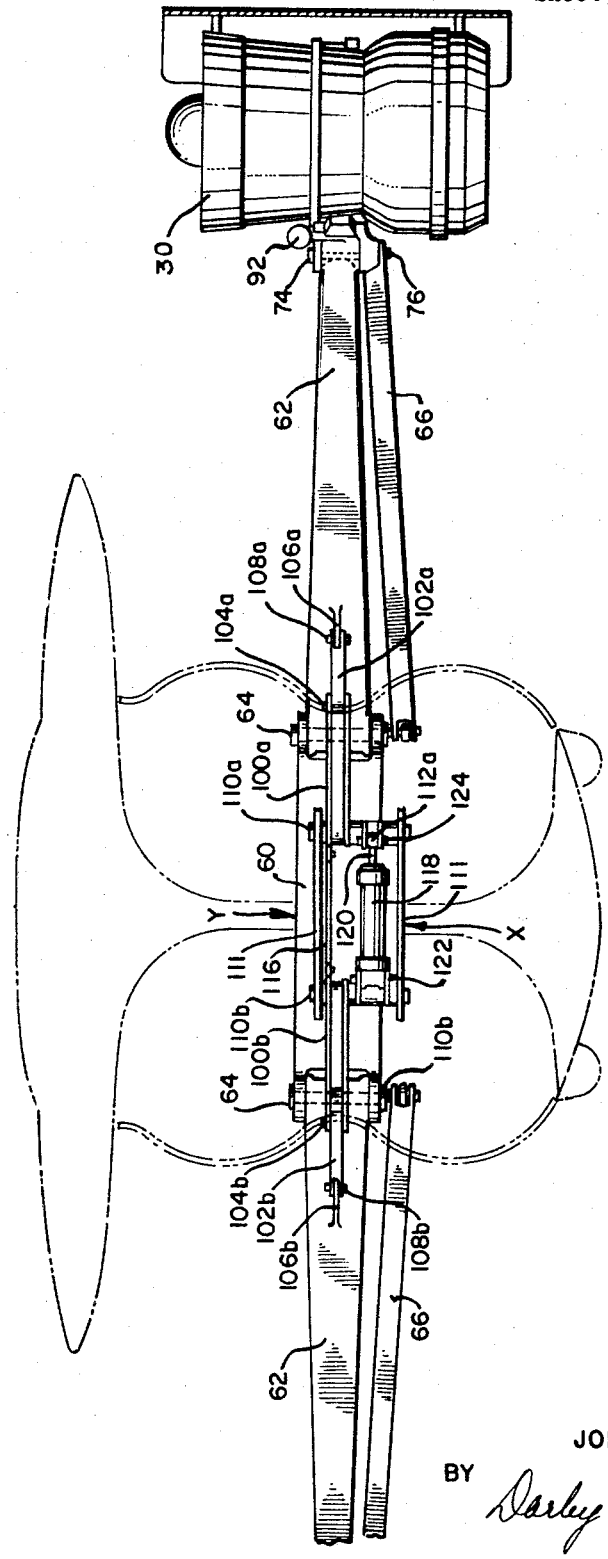
FIGURE 7 is a front view showing the extended lifting jet engines.

A portion of the aircraft frame is shown at 60 and corresponds to the existing frame of conventional aircraft. An elongated support beam 62 having a slight taper as shown in FIGURES 4 and 7 is pivotally retained within a corner of frame 60 by a pin 64 thereby permitting the beam 62 to pivot between the positions illustrated in FIGURES 3 and 5. A radial link 66 substantially parallel to beam 62 is pivotally secured to a projection 68 extending from frame 60 by a pin 70. The link 66 is mounted slightly beneath beam 62 and both members are pivotally secured to a mounting block 72 by respective pins 74 and 76 (FIGS. 3 and 5). The fuselage 10 includes a suitably shaped side opening to permit beam 62 and link 66 to swing into and out of the fuselage.

The engines 28 and 30 are retained in a yoke 80 which is pivotally mounted on an axle 82 extending from the block 72. Yoke 80 may be rotatably supported on axle 82 by means of conventional ball bearings 84 and 86, or the like. Axle 82 is fixed to the mounting block 72 so that there is no relative movement between the two.

The yoke 80 is immovably fixed to a pinion sector 88 which engages a rack 90 through a slot in block 72 (not illustrated). Rack 90 is movable longitudinally by means of hydraulic cylinders 92 and 94. Hydraulic cylinders 92 and 94 are mounted for movement with engines 26 and 28 and include respective actuating pistons 95 and 96 engaging the rack 90 to thereby rotate the engines 28 and 30 between the positions shown in FIGURE 6 and FIGURE 4. Instead of purely reciprocating motion, rack 90 and pinion sector 88 may be replaced by a standard worm-gear combination of the type which is widely used in the aircraft industry. To swing from a vertical to a horizontal position, it is, of course, necessary that the engines be movable through at least ninety degrees. As a practical matter, it may further be desirable to permit sufficient rotation so that the engines can be tilted "back" about fifteen additional degrees. The desired amount of rotation is readily achieved by suitable correlation of rack 90 and pinion sector 88 in a well known manner.

A contoured door 97 is secured to the engines 26 and 28 by suitable studs 98. The shape of door 97 is such that when the engines are retracted into the fuselage, the door fits flush with the adjacent fuselage portions (see FIG. 7) thereby minimizing air resistance.

The mechanism used to extend the engines from the fuselage consists of a hydraulically operated lever system. It is possible in the case of this mechanism to employ a single actuator and therefore in the following description the letters a and b are used adjacent various identifying numerals to signify that a corresponding part (sometimes not illustrated) functions with reference, respectively, to the port and starboard engines. Parts identified by the same numeral perform the same function with respect to their associated engines.

The levers consist of a long arm 100a and a short arm 102a pivotally connected at 104a. The short arm 102a is connected to an extension 106a of the support beam 62 by any conventional pin or other pivot member 108a.

A vertical axle 110a is secured in top and bottom support members 111 (FIG. 7) of the fuselage so as to be restrained from horizontal or vertical movement. The long arm 100a is connected to the axle 110a so that it can rotate with respect thereto when actuated. The arm 100a includes a small lug 112a extending generally in the fore direction, and a short ear 114a extending beyond axle 110a. The corresponding ear 114b differs slightly in construction from ear 114a in that it extends in a generally transverse direction from arm 100b. The ends of ears 114a and 114b are rigidly connected together by means of a synchronizing bar 116 which ensures that the rotation of the arms 100a and 100b (and thus the levers attached thereto) occurs in synchronization, so that the two pairs of lifting jets are extended substantially simultaneously.

The driving force for the levers is derived from a conventional hydraulic system comprising a cylinder 118 capable of controlling the relative position of a piston rod 120 in response to the flow of hydraulic fluid. The closed end of cylinder 118 is connected to lug 112b by means of a connector pin 122, and the piston rod 120 is connected to an end of lug 112a by means of a suitable fastener 124. Hydraulic control systems such as this are conventional and well known in the aircraft arts.

The operation of the lever system herein described is evident from comparison of FIGURES 3 and 5, showing the lift engines in their retracted and extended states, respectively. Thus, when it is desired to extend the lift engines, fluid is introduced under pressure at the left end 118' of cylinder 118, causing the rod 120 to move into the cylinder. As this occurs, the lug 112a is pulled toward cylinder 118, causing the long arm 100a to rotate in a clockwise direction. At the same time, because of the synchronizing bar 116, arm 100b commences rotation in the counterclockwise direction to the same extent. As the arms 100a and 100b rotate, the elbows formed by arms 100 and 102 and the respective support beams 62 pivot outwardly from the support point 64 until the lifting jets 26, 28 and 30, 32 are in the extended position shown in FIGURE 5. During the extension movement, the cylinder 118 will move in a slight arc from the position illustrated in FIGURE 3 to that of FIGURE 5. If desired, conventional means may be used to limit the movement of the arms 100a and 102a to the full position as illustrated in FIGURE 5.

The invention provides benefits collateral to those discussed above. For example, access to the lifting engines is improved and cooling is optimized. Roll control may be achieved during vertical or hovering flight by proper thrust modulation of the extended lifting jets. Differential rotation of the lifting jets will provide yaw control. Pitch control can be obtained by modulating the deflected thrust of the horizontal propulsion engines in the rear. The lifting jets may be rotated to the horizontal position and used as an emergency back-up for the main propulsion units in horizontal flight.

Although a preferred embodiment of the invention has been illustrated and described, the invention is not necessarily so limited, and many modifications will be obvious to those skilled in the art. For example, the number and specific form of lifting jets employed is not material to the invention, nor is the specific apparatus used in positioning the lifting jets, either in extending them from the fuselage or adjusting them for a desired amount of thrust. As an example, the lifting jets may be of the type disclosed in the SAE paper 635B entitled "Powerplant System for V/STOL Aircraft," by A. A. Lombard and A. J. Heyworth. Also, as previously noted, the invention may be applicable in cases where the lifting jets are not aligned vertically with respect to earth. Other modifications and variations of the invention will be obvious to those skilled in the art and, accordingly, the invention should be defined in the light of the following claims.

What is claimed is:

1. An aircraft having a fuselage, at least one lifting jet engine associated with each side of said fuselage, each lifting jet engine adapted to be stored in said fuselage with its longitudinal axis parallel to the longitudinal axis of the aircraft, means for extending said lifting jet engines from opposite sides of said fuselage to respective positions exterior of said fuselage while maintaining said axes generally parallel to said aircraft axis, means for rotating said lifting jet engines about axes generally transverse to said fuselage so as to incline the longitudinal axes of said lifting jet engines with respect to a horizontal plane to thereby provide substantial vertical thrust.

2. An aircraft according to claim 1, wherein said extending means includes at least two elongated mounting arms pivotally mounted with respect to opposite sides of said aircraft, the lifting jet engines on opposite sides of said aircraft being mounted on the respective arms, said rotating means including means for rotating said lifting jet engines with respect to their associated mounting arms.

3. An aircraft according to claim 1, including contoured doors immovably secured to said lifting jet engines, said contoured doors being shaped to form a continuous surface of said fuselage when said lifting jet engines are stored within the fuselage.

4. An aircraft according to claim 2, including contoured doors immovably secured to said lifting jet engines, said contoured doors being shaped to form a continuous surface of said fuselage when said lifting jet engines are stored within the fuselage.

5. An aircraft according to claim 2, including at least two of said lifting jet engines mounted on each of said mounting arms, the lifting jet engines on each side of said aircraft being displaced vertically from each other when stored in said fuselage.

References Cited

UNITED STATES PATENTS 2,806,665  9/1957  Gibson.
3,302,907  2/1967  Wilde et al. _____ 244—54

MILTON BUCHLER, *Primary Examiner.*

JAMES E. PITTENGER, *Assistant Examiner.*